US012729289B2

(12) United States Patent
Di Ronza et al.

(10) Patent No.: US 12,729,289 B2
(45) Date of Patent: Sep. 8, 2026

(54) SELF-HEALING RUBBER COMPRISING A POLY(METHACRYLIC) OLIGOMER

(71) Applicant: Bridgestone Europe NV/SA [BE/BE], Zaventem (BE)

(72) Inventors: Raffaele Di Ronza, Rome (IT); Yoshihiro Morishita, Tokyo (JP); Alan Wemyss, Coventry (GB); Chaoying Wan, Coventry (GB)

(73) Assignee: Bridgestone Europe NV/SA, Zaventem (BE)

( * ) Notice: Subject to any disclaimer, the term of this patent is extended or adjusted under 35 U.S.C. 154(b) by 563 days.

(21) Appl. No.: 18/273,024

(22) PCT Filed: Jan. 19, 2022

(86) PCT No.: PCT/EP2022/051109

§ 371 (c)(1),
(2) Date: Jul. 18, 2023

(87) PCT Pub. No.: WO2022/157186

PCT Pub. Date: Jul. 28, 2022

(65) Prior Publication Data

US 2024/0294738 A1 Sep. 5, 2024

(30) Foreign Application Priority Data

Jan. 19, 2021 (EP) .................................... 21152345

(51) Int. Cl.

| | |
|---|---|
| ***C08L 7/00*** | (2006.01) |
| ***C08J 3/24*** | (2006.01) |
| ***C08K 3/06*** | (2006.01) |
| ***C08K 3/22*** | (2006.01) |
| ***C08K 5/00*** | (2006.01) |
| *B29C 73/22* | (2006.01) |
| *C08J 3/20* | (2006.01) |

(52) U.S. Cl.
CPC ................ *C08L 7/00* (2013.01); *C08J 3/246* (2013.01); *C08K 3/06* (2013.01); *C08K 3/22* (2013.01);
(Continued)

(58) Field of Classification Search
CPC ........ C08L 7/00; C08L 2205/08; C08L 21/00; C08J 3/246; C08J 3/203; C08J 2307/00;
(Continued)

(56) References Cited

U.S. PATENT DOCUMENTS

| | | | |
|---|---|---|---|
| 4,720,526 | A | 1/1988 | Roland |
| 5,310,807 | A | 5/1994 | Antonelli et al. |

(Continued)

FOREIGN PATENT DOCUMENTS

| | | | |
|---|---|---|---|
| CN | 101068875 | A | 11/2007 |
| CN | 102741342 | A | 10/2012 |

(Continued)

OTHER PUBLICATIONS

International Search Report, Corresponding Application No. PCT/EP2022/051109, Aug. 4, 2022, 3 pages.

(Continued)

*Primary Examiner* — Doris L Lee
(74) *Attorney, Agent, or Firm* — Patterson Intellectual Property Law, PC

(57) ABSTRACT

The present invention relates to a rubber composition comprising a poly(methacrylic acid) oligomer, a process for preparing the rubber composition, a cured rubber composition, and a self-healing tire prepared by using the rubber composition. The invention further relates to an amphiphilic block copolymer, and a process for its preparation. The amphiphilic block copolymer can be used as compatibilizer in the preparation of the rubber composition.

20 Claims, 6 Drawing Sheets

(52) U.S. Cl.
CPC ............ *C08K 5/0025* (2013.01); *B29C 73/22* (2013.01); *C08J 3/203* (2013.01); *C08J 2307/00* (2013.01); *C08J 2433/12* (2013.01); *C08K 2003/2296* (2013.01); *C08L 2205/08* (2013.01)

(58) Field of Classification Search
CPC .......... C08J 2433/12; C08K 3/06; C08K 3/22; C08K 5/0025; C08K 2003/2296; B29C 73/22; B29C 73/18; B29L 2030/00
See application file for complete search history.

(56) References Cited

U.S. PATENT DOCUMENTS

| | | | | |
|---|---|---|---|---|
| 5,602,220 | A | 2/1997 | Haddleton et al. | |
| 9,090,724 | B2 | 7/2015 | Jarvis et al. | |
| 9,580,529 | B2 | 2/2017 | Sirak et al. | |
| 2002/0055587 | A1 | 5/2002 | Lau | |
| 2002/0058752 | A1 | 5/2002 | Lau | |
| 2014/0256897 | A1* | 9/2014 | Jarvis | C09D 7/43 526/318.4 |
| 2018/0305504 | A1* | 10/2018 | Kitago | C08L 9/06 |

FOREIGN PATENT DOCUMENTS

| | | | | |
|---|---|---|---|---|
| EP | 0229481 | A2 | 7/1987 | |
| EP | 1295922 | A2 | 3/2003 | |
| EP | 2735587 | A2 | 5/2014 | |
| WO | WO-9850436 | A1 * | 11/1998 | C08F 220/14 |
| WO | 2020157121 | A1 | 8/2020 | |

OTHER PUBLICATIONS

China Intellectual Property, Chinese Search Report for Chinese Patent Application No. 2022800226797, dated May 1, 2026, 3 pages.

* cited by examiner

CCTP

ZnO $Zn^{2+}$ $Zn^{2+}$ (i) Co(II)

V-601

(ii) DMPP

HS-R (iii) TFA

Fig. 8
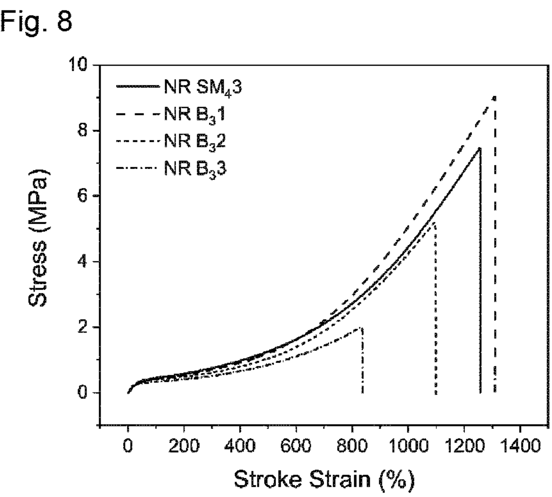
Fig. 9a
Fig. 9b
Fig. 9c
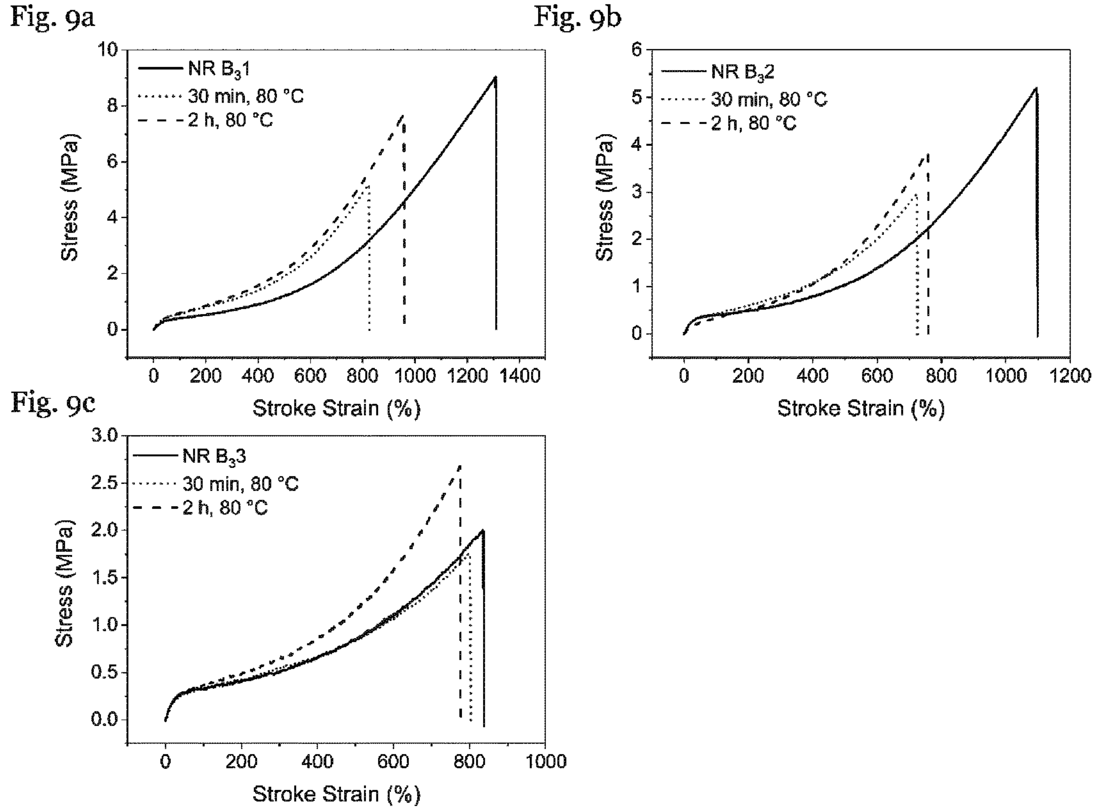

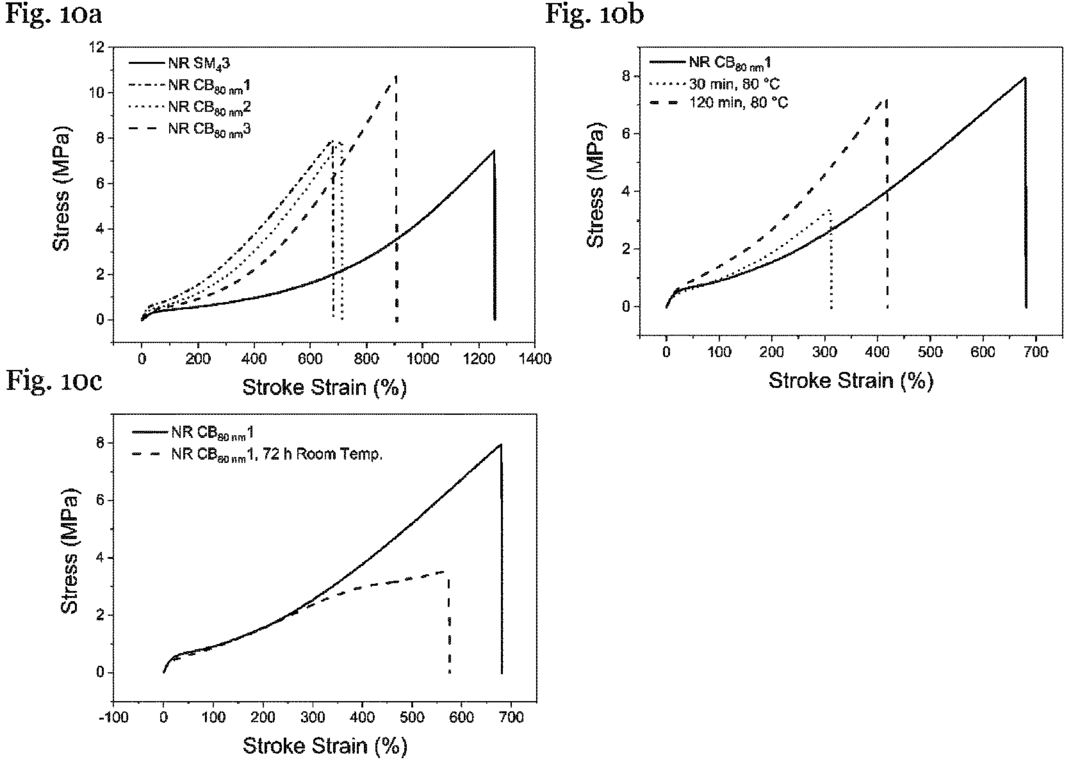
Fig. 10a
NR $SM_4$3
NR $CB_{80\,nm}$1
NR $CB_{80\,nm}$2
NR $CB_{80\,nm}$3
Stress (MPa)
Stroke Strain (%)
Fig. 10b
NR $CB_{80\,nm}$1
30 min, 80 °C
120 min, 80 °C
Stress (MPa)
Stroke Strain (%)
Fig. 10c
NR $CB_{80\,nm}$1
NR $CB_{80\,nm}$1, 72 h Room Temp.
Stress (MPa)
Stroke Strain (%)
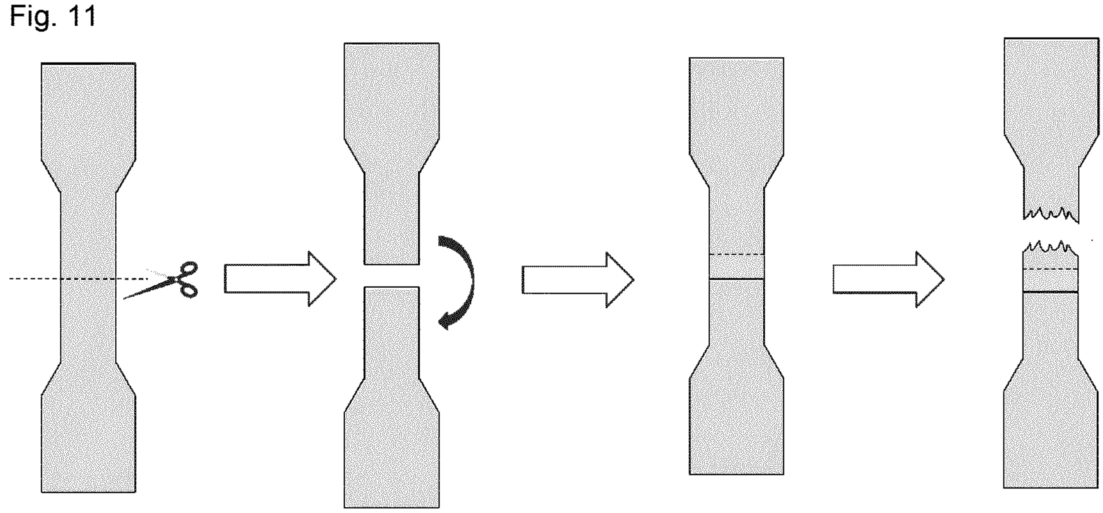
Fig. 11

SBR $SM_4$3 TMTS
30 mins, 80 °C
2 hrs, 80 °C
Stress (MPa)
Stroke Strain (%)

BR $SM_4$3 TMTS
30 mins, 80 °C
2 hrs, 80 °C
Stress (MPa)
Stroke Strain (%)

2 hrs, 80 °C
30 min, 80 °C
Stress Recovery (%)
Strain Recovery (%)

2 hrs, 80 °C
30 min, 80 °C
Stress Recovery (%)
Strain Recovery (%)

SELF-HEALING RUBBER COMPRISING A POLY(METHACRYLIC) OLIGOMER

The present invention relates to the field of self-healing rubbers. Particularly, the present invention refers to a rubber composition comprising a poly(methacrylic acid) oligomer and optionally an amphiphilic block copolymer compatibilizer, processes for their preparation, and their use in a self-healing tire.

Self-healing natural rubbers are known in the state of the art. C. Xu et., "Design of Self-Healing Supramolecular Rubbers by Introducing Ionic Cross-Links into Natural Rubber via a Controller Vulcanization", ACS Appl. Mater. Interfaces 2016, 8, 17728-17737, DOI: 10.1021/acsami.6b05941, describe a controlled peroxide-induced vulcanization to generate ionic crosslinks via polymerization of zinc dimethacrylate in natural rubber. In Ch. Xu et., "Self-Healing Natural Rubber with Tailorable Mechanical Properties based Ionic Supramolecular Hybrid Network", ACS Appl. Mater. Interfaces 2017, 9, 29363-29373, DOI: 10.1021/acsami.7b09997, the authors aimed at enhancing the properties of the self-healing natural rubber by an in-situ polymerization reaction of excess zinc oxide (ZnO) and methacrylic acid in natural rubber to form zinc dimethacrylate. While self-healing natural rubbers are known from these publications, their mechanical strength is poor.

C. Atkins et al., "A simple and versatile route to amphiphilic polymethacrylates: catalytic chain transfer polymerisation (CCTP) coupled with post-polymerisation modifications", Poly. Chem., 2019, 10, 646-655, describe the synthesis of an amphiphilic polymethacrylate starting from poly(glycidyl methacrylate) polymers prepared by catalytic chain transfer polymerization, followed by Michael-thiol addition and ring-opening of the epoxide groups of the glycidyl methacrylate using ethanolamine. This article does not describe synthesis of polymethacrylates having poly (methacrylic acid) blocks.

U.S. Pat. No. 4,720,526 A describes cured rubber compositions prepared from curable rubber compositions that contain a rubber, zinc or magnesium dimethacrylate, and a peroxide curing agent. U.S. Pat. No. 5,310,807 A relates to an economic process for making dispersions of star polymers with crosslinked core to which arms of macromonomers are attached. The macromonomers are formed via a catalytic cobalt (II)-containing chain transfer agent. The star polymer dispersions can be used in coating compositions. EP 1 295 922 A2 is directed to pigment dispersing resins comprising macromonomers obtained by using a catalytic chain transfer (CCT) agent, wherein particularly a cobalt (II) complex is used. The same or similar cobalt complexes are used in U.S. Pat. No. 9,580,529 B2 for preparing low-viscosity polymers that can be used as base fluids for lubricants. Such cobalt catalysts are also used in U.S. Pat. No. 9,090,724 B2 for preparing macromonomers of defined molecular weights that are used to prepare low-viscosity copolymers suitable as rheology modifier.

An object of the present invention was to provide a rubber composition which in its cured state provides improved self-healing properties and simultaneously high mechanical strength, to enable its use in tires.

Surprisingly, it was found that the use of a poly(methacrylic acid) oligomer of a specified molecular weight in a rubber composition solves the trade-off between self-healing efficiency and mechanical strength in the cured rubber. The cured rubber is self-healing and at the same time achieves high mechanical strength, which permits its use in tires. Furthermore, it was found that an amphiphilic poly(methacrylic acid) block copolymer provided an improved dispersion or distribution of the components in the rubber composition. This better dispersion further enhances the mechanical strength and the self-healing efficiency of the cured rubber.

Accordingly, the present invention refers to a process for preparing a rubber composition comprising at least the following steps:

(A) polymerizing methacrylic acid (MAA) in the presence of a Co(II) complex as catalytic chain transfer agent, to obtain a poly(methacrylic acid) oligomer having a number average molecular weight ($M_n$) in the range of from 160 to 3200 g/mol and preferably a dispersity Đ of equal to or less than 4;

(B) blending the poly(methacrylic acid) oligomer with zinc oxide, a dienic rubber, sulfur, and a vulcanization accelerator, to prepare the rubber composition.

In a preferred embodiment of the process, in step (B), the poly(methacrylic acid) oligomer is mixed with zinc oxide to obtain a zinc salt of the poly(methacrylic acid) oligomer, before blending with the dienic rubber, sulfur, and vulcanization accelerator.

In a preferred embodiment of the process, in step (A) the molecular weight of the poly(methacrylic acid) oligomer is controlled by the ratio of methacrylic acid to the Co(II) complex, in particular wherein a ratio of methacrylic acid to the Co(II) complex of $10^6$:20 to $10^6$:180 is used. In preferred embodiments, the poly(methacrylic acid) oligomer has a number average molecular weight ($M_n$) in the range of from 240 to 2400 g/mol, preferably from 320 to 2000 g/mol. In other preferred embodiments, the poly(methacrylic acid) oligomer has a dispersity Đ of equal to or less than 3, preferably of equal to or less than 2.

In other preferred embodiments of the process, the Co(II) complex is a cobaloxime boron fluoride, in particular the Co(II) complex is bis[(difluoroboryl)-dimethylglyoximato] cobalt(II).

In further preferred embodiments, in step (B) the poly (methacrylic acid) oligomer is mixed with zinc oxide at a weight ratio of from 1.0:0.2 to 1.0:2.0.

In other preferred embodiments, in step (B) the dienic rubber is selected from the group consisting of a natural rubber, an isoprene rubber, a styrene-butadiene rubber, a butadiene rubber, and combinations thereof.

In exemplary embodiments, in step (B) the vulcanization accelerator is based on a sulfenamide compound and/or a thiazole compound.

In other preferred embodiments, in step (B) the amount of the zinc salt of the poly(methacrylic acid) oligomer is 5.0 to 40 phr.

In a particularly preferred embodiment of the process, in step (B) additionally an amphiphilic block copolymer compatibilizer is blended, wherein the amphiphilic block copolymer compatibilizer comprises at least a poly(methacrylic acid) block and an aliphatic hydrocarbon chain block, wherein both blocks are connected via a sulfide linkage. Preferably, the amount of the amphiphilic block copolymer compatibilizer is 0.5 to 7.5 phr.

In other preferred embodiments, in step (B) additionally a filler is used, in particular in an amount of 5.0 to 80 phr.

The present invention further relates to a rubber composition comprising

- a poly(methacrylic acid) oligomer having a number average molecular weight ($M_n$) in the range of 160 to 3200 g/mol;
- zinc oxide;
- a dienic rubber;

filler;
sulfur; and
a vulcanization accelerator.

In addition, the present invention further relates to a rubber composition comprising

- a Zn salt of a poly(methacrylic acid) oligomer having a number average molecular weight ($M_n$) in the range of 160 to 3200 g/mol;
- a dienic rubber;
- filler;
- sulfur; and
- a vulcanization accelerator.

In a specifically preferred embodiment, the rubber composition further comprises an amphiphilic block copolymer compatibilizer comprising a poly(methacrylic acid) block and an aliphatic hydrocarbon chain block, wherein both blocks are connected via a sulfide linkage and the poly (methacrylic acid) block has a number average molecular weight ($M_n$) in the range of from 160 to 1600 g/mol. Preferably, the amount of the amphiphilic block copolymer compatibilizer in the rubber composition is 0.5 to 10.0 phr, in particular 0.5 to 7.5 phr.

In another preferred embodiment, the poly(methacrylic acid) oligomer and zinc oxide are present as a preformed salt, wherein the weight ratio of poly(methacrylic acid) oligomer to zinc oxide is in the range of from 1.0:0.2 to 1.0:2.0. The preformed salt is formed by mixing the two components in water and drying to obtain a powder, before blending with the other rubber components. In another embodiment, the amount of the preformed zinc salt of the poly(methacrylic acid) oligomer in the rubber composition is 5.0 to 40 phr.

The present invention further provides a cured rubber composition obtainable by curing the above described rubber composition.

Furthermore, the present invention provides a self-healing tire produced by using the above described rubber composition.

In addition, the present invention provides an amphiphilic block copolymer comprising at least a poly(methacrylic acid) block having a number average molecular weight of 160 to 1600 g/mol ($M_n$) and an aliphatic hydrocarbon chain block, wherein both blocks are connected via a sulfide linkage. The amphiphilic block copolymer is particularly suitable as compatibilizer in the rubber composition.

Further, the present invention provides a process for preparing an amphiphilic block copolymer, the process comprising:

(a) polymerizing tert-butyl methacrylate in the presence of a Co(II) complex as catalytic chain transfer agent, to obtain a poly(tert-butyl methacrylate) oligomer having a number average molecular weight ($M_n$) of 284 bis 2840 g/mol;

(b) Michael-addition of an aliphatic thiol RSH to the poly(tert-butyl methacrylate) oligomer in the presence of a phosphine, to obtain the addition product, wherein R is a linear alkyl group having 6 to 30 carbon atoms; and (c) acidic hydrolysis of the addition product, to remove the tert-butyl groups and to obtain the amphiphilic block copolymer.

Preferably, the Co(II) complex used is a cobaloxime boron fluoride, in particular bis[(difluoroboryl)-dimethylglyoximato]cobalt(II).

All references herein to the unit “phr” designate parts by weight per 100 parts by weight of rubber.

The term “molecular weight” as used herein, such as the number average molecular weight ($M_n$), refers to a determination by size exclusion chromatography (SEC), and preferably additionally by 1H nuclear magnetic resonance (NMR) spectroscopy. The term “dispersity” as used herein, refers to the molecular weight distribution Đ and is determined from the following equation:

$$Đ = M_w/M_n$$

wherein $M_w$ is the weight average molecular weight and $M_n$ is the number average molecular weight.

Preferred embodiments of the invention are described in the description hereinafter, in the examples, the figures and the claims.

The Figures show:

Figure 4A:
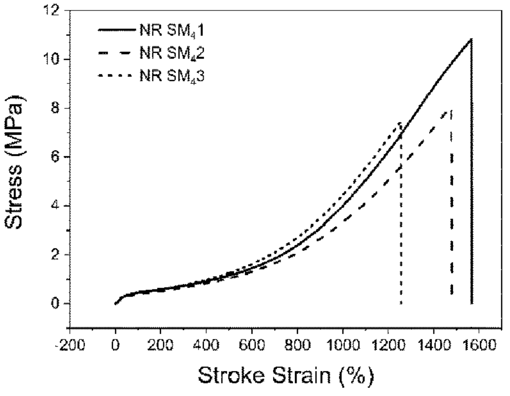
Figure 4B:
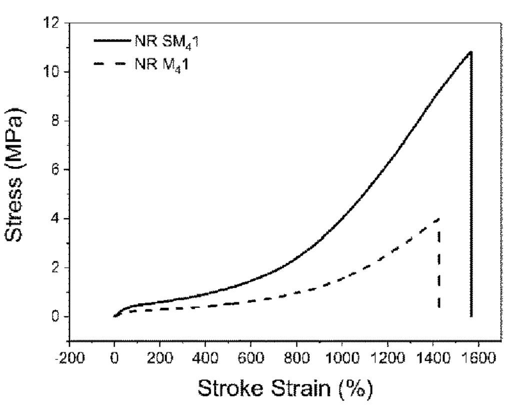

FIGS. 4*a* and 4*b* are diagrams of stress versus stroke strain for cured rubbers of the examples.

Figure 5A:
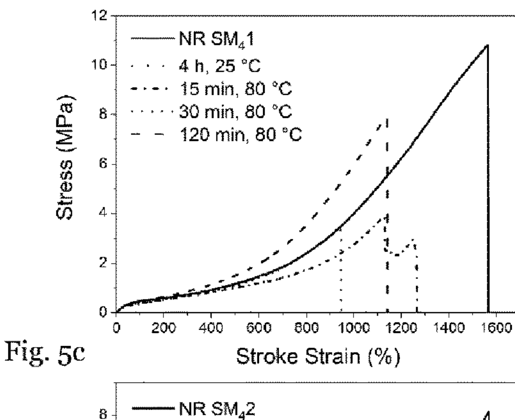
Figure 5B:
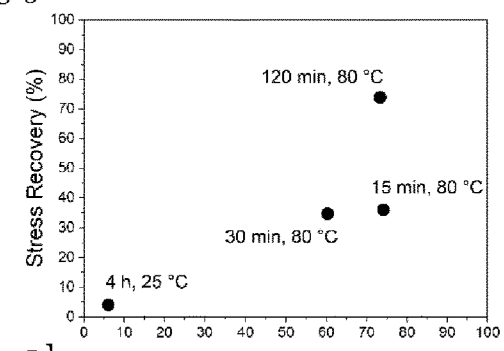
Figure 5C:
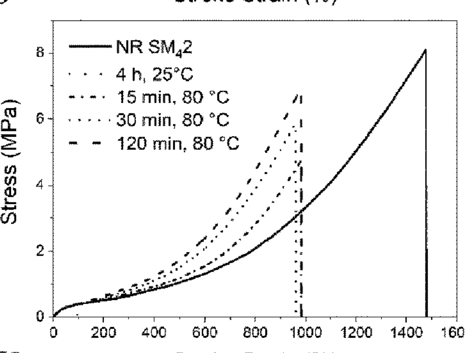
Figure 5D:
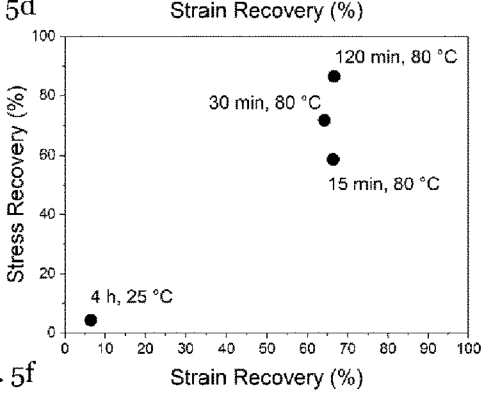
Figure 5E:
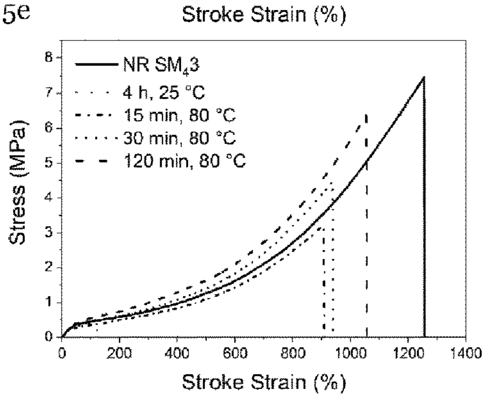
Figure 5F:
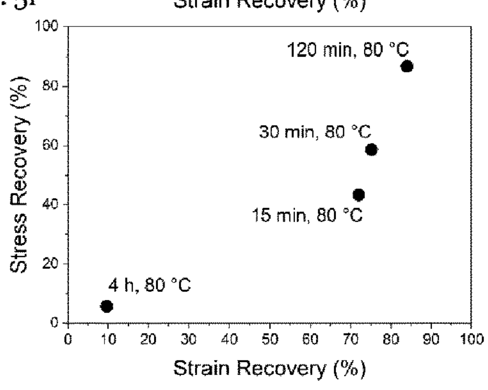

FIGS. 5*a*, 5*c* and 5*e* are diagrams of stress versus stroke strain for cured rubbers of the examples at different healing conditions; FIGS. 5*b*, 5*d* and 5*f* show the corresponding diagrams of stress versus stroke strain recovery.

Figure 6A:
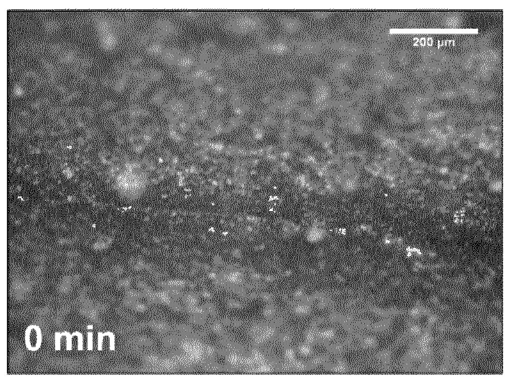
Figure 6B:
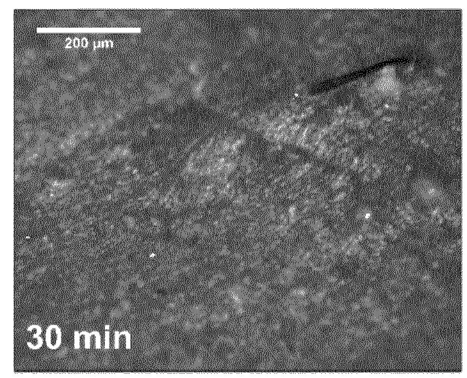
Figure 6C:
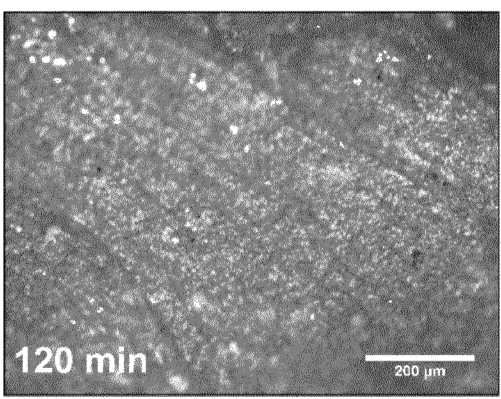

FIGS. 6*a* to 6*c* are images of an optical microscope of the healing of a cured rubber at different healing conditions.

Figure 7A:
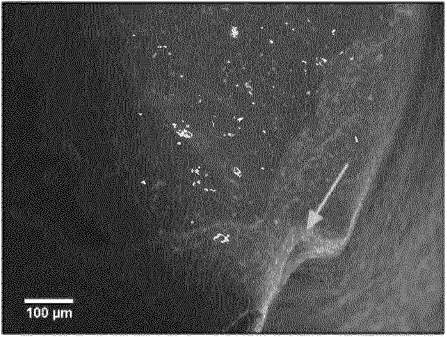
Figure 7B:
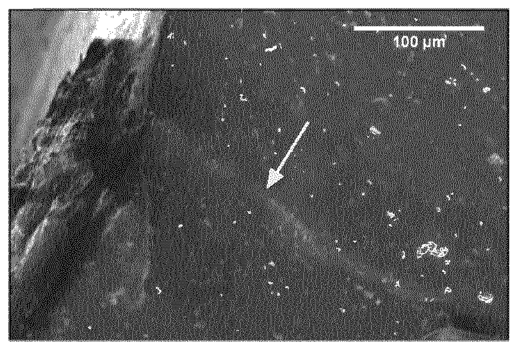

FIGS. 7*a* and 7*b* are SEM images of a cured rubber after 30 min healing at 80° C.

FIG. 8 is a diagram of stress versus stroke strain for cured rubbers of the examples, including rubbers containing the amphiphilic block copolymer compatibilizer of the invention.

FIGS. 9*a* to 9*c* are diagrams of stress versus stroke strain for cured rubbers containing the amphiphilic block copolymer compatibilizer of the invention at different healing conditions.

FIG. 10*a* shows stress versus stroke strain for cured rubbers containing 40 phr of carbon black that is 80 nm is diameter. FIG. 10*b* shows the recovery after self-healing at 80° C. for 30 minutes and 2 hours, and FIG. 10*c* shows the recovery after self-healing at room temperature for 72 hours.

FIG. 11 shows an illustration of the process used to quantify the self-healing efficiency of the rubbers.

Figures 12A, 12B, 12C, 12D:
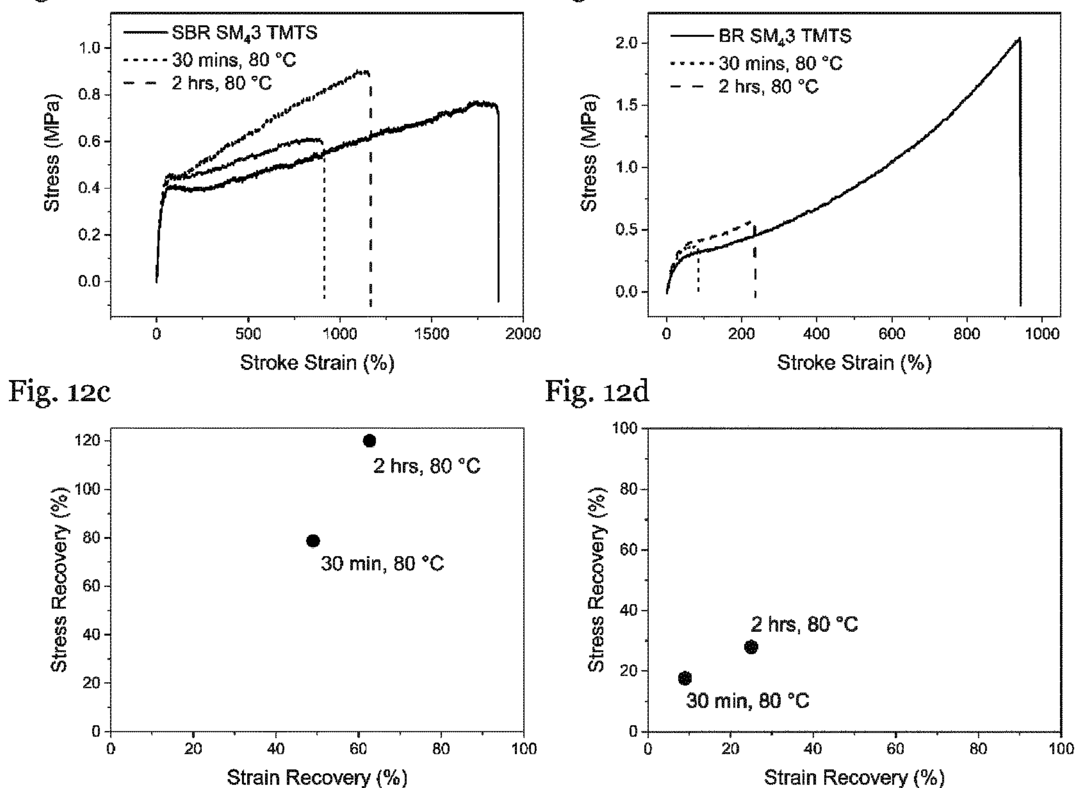

FIGS. 12*a* and 12*b* are diagrams of stress versus stroke strain for cured styrene-butadiene rubber (SBR) and butadiene rubber (BR), respectively, with examples at different healing conditions; FIGS. 12*c* and 12*d* show the corresponding diagrams of stress versus strain recovery.

Preferred embodiments of the invention are described in the description hereinafter, in the examples, the figures and the claims.

The rubber composition according to the present invention is a curable composition and comprises at least a dienic rubber, a poly(methacrylic acid) oligomer of specified molecular weight, zinc oxide (ZnO), sulfur, a vulcanization accelerator, and preferably a filler.

The dienic rubber is preferably selected from natural rubber (NR), styrene-butadiene rubber (SBR), an isoprene rubber, a butadiene rubber (BR), or combinations thereof. Preferably, natural rubber (NR), styrene-butadiene rubber (SBR), or a combination thereof is used. Suitable blends are 80 to 90 weight-% of natural rubber and 20 to 10 weight-% of styrene-butadiene rubber, based on 100 weight-% of the rubber.

According to the invention the poly(methacrylic acid) oligomer before the formation of a salt has a number average molecular weight ($M_n$) in the range of from 160 to 3200 g/mol, with a dispersity (Đ) of equal to or less than 4, preferably from 240 to 2400 g/mol with a dispersity (Đ) of equal to or less than 2, more preferably from 240 to 1200 with a dispersity (Đ) of less than 2. The molecular weight of 160 to 3200 g/mol corresponds to a degree of polymerization of 2-40.

Figures 1, 2, 3:
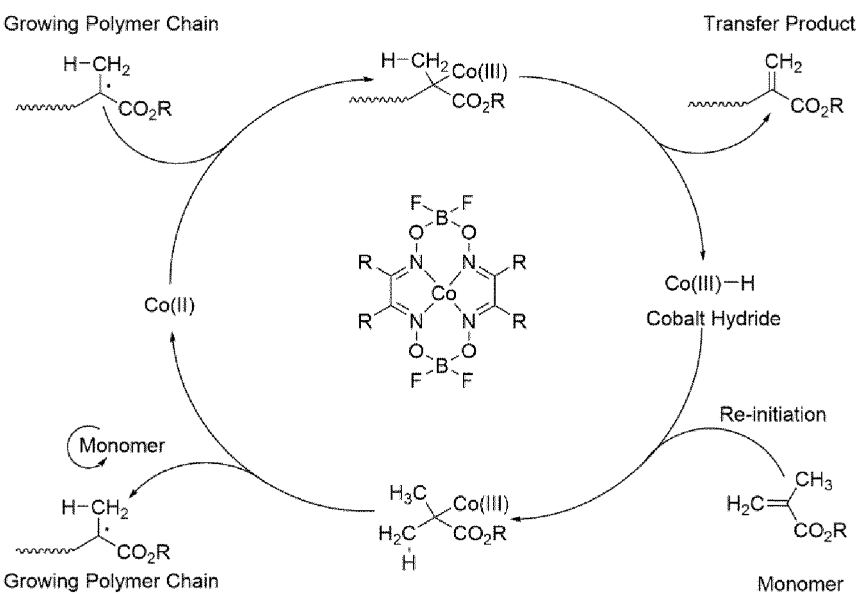
FIG. 1 shows the catalytic chain transfer polymerization (CCTP) of methacrylic acid using a Co(II) complex, to yield the poly(methacrylic acid) oligomer (p(MAA) oligomer).
FIG. 2 shows the formation of the Zn salt from poly (methacrylic acid) oligomer and zinc oxide.
FIG. 3 shows the synthesis of the amphiphilic block copolymer compatibilizer following three steps of (i) catalytic chain transfer polymerization; (ii) dimethylphenylphosphine (DMPP) catalyzed Michael addition of a thiol to the unsaturated end group of poly(tert-butyl methacrylate) macromonomer; and (iii) hydrolysis of the tert-butyl groups of the macromonomer by trifluoroacetic acid (TFA).

The oligomer is produced by polymerization of methacrylic acid (MAA) via catalytic chain transfer (CCT) using a cobalt (II) complex, wherein the polymerization or the molecular weight of the oligomer is controlled by the ratio of the monomer (MAA) and the catalyst. An exemplary embodiment for producing the oligomer using cobaloxime as catalyst is shown in FIG. 1, wherein the group R of the polymer chain is H, and the group R of the cobaloxime is a group selected such to allow its solubility in the monomer/solvent system used, for example, R is methyl.

The cobalt(II) complex or catalyst can be any cobalt complex known in the art for catalytic chain transfer polymerization (CCTP). Suitable catalysts are described, for example, in EP 1 295 922 A2, U.S. Pat. Nos. 9,090,724 B2 and 9,580,529 B2. Preferably, bis[(difluoroboryl)-dimethylglyoximato]cobalt(II) is used, which is shown in FIG. 1.

ZnO is commonly used as additive in rubber compositions for tires. In the present invention, ZnO is used for forming a salt with the poly(methacrylic acid) oligomer (p(MAA)) oligomer). FIG. 2 shows the catalytic chain transfer polymerization (CCTP) of methacrylic acid to result in the poly (methacrylic acid) oligomer (p(MAA) oligomer), which, upon addition of zinc oxide, forms a zinc salt. The zinc salt preferably is added as preformed salt into the rubber composition.

In addition, it is possible to add ZnO and the p(MAA) oligomer separately into the rubber composition and the Zn salt forms in-situ.

The weight ratio of poly(methacrylic acid) oligomer to ZnO is in the range of from 1.0:0.2 to 1.0:2.0, preferably from 1.0:0.5 to 1.0:1.5, for example 1.0:1.0.

It is believed that the zinc salt of p(MAA) oligomer/ZnO generates a reversible (non-covalent) ionic supramolecular network in cured rubber providing self-healing ability to the rubber. Particularly, it is believed that ionic pairs of the zinc cations and the carboxylic acid units that are woven into the rubber form hierarchical cluster. The ionic clusters are believed to contribute simultaneously to the self-healing ability and the mechanical strength of the rubber.

Suitable fillers for the rubber composition are subject to no restrictions and known in the art of tire production. Exemplary fillers are carbon black, silica, and combinations thereof. Both carbon black and silica with specific surface areas are commercially available and can be used. Fillers are typically used in amounts of 5 phr to 80 phr, preferably of 5 phr to 50 phr, more preferably of 10 phr to 40 phr.

In the present invention, sulfur is used as crosslinking agent in the vulcanization. The sulfur provides covalent crosslinks in the cured rubber composition contributing to the mechanical strength of the cured rubber.

Suitable vulcanization accelerators are based on sulfenamide compounds and/or thiazole compounds. Preferably, N-cyclohexyl-2-benzothiazole sulfenamide (known as CBS) or tetramethylthiuram monosulfide is used.

For a better dispersion of the components in the rubber composition, a compatibilizer can be used. Suitable compatibilizers are known in the art. Exemplary compatibilizers are block copolymers containing one (meth)acrylic acid block made using CCTP (catalytic chain transfer polymerization), RAFT (reversible addition-fragmentation chain transfer) polymerization or ATRP (atom transfer radical polymerization). A particularly preferred compatibilizer is an amphiphilic block copolymer comprising at least a poly (methacrylic acid) block having a number average molecular weight ($M_n$) of 160 to 1600 g/mol and an aliphatic hydrocarbon chain block, wherein both blocks are connected via a sulfide linkage. An exemplary embodiment for producing this compatibilizer is shown in FIG. 3 and is described below.

The rubber composition can comprise further additives, in particular additives that are commonly used in the art for tire production. Such additives are lubricants, pigments, activators, softeners, plasticizers, antioxidants, fatty acids (such as stearic acid). Commonly, the total amount of these additives is not more than 10 weight-% based on the 100 weight-% of the rubber composition or not more than 10 phr.

The invention also provides cured rubber compositions obtained after curing of the curable rubber compositions of the invention. The curing can be carried out as known in the art and is subject to no restrictions. Suitable curing temperatures are in the range of from 150 to 160° C.

The invention further provides self-healing tires produced by using the rubber composition of the invention. The rubber composition used for producing the tire comprises at least partly the rubber composition of the invention, depending on the desired degree of self-healing property of the tire. Preferably, at least 90 weight-%, more preferably about 100 weight-%, of the rubber composition of the invention are used in the rubber composition of the tire. The production of the tires from the rubber composition in suitable devices is carried out as known in the art.

During curing of the rubber composition, a proportion of the ω-vinyl end groups of the pMAA/ZnO salt are coupled (grafted) to the vinyl group of the dienic rubber backbone. The coupling is either direct or through a sulfur bridge. In addition, covalent links due to sulfur linkages are formed as known in the art.

The rubber composition of the invention imparts self-healing properties and high mechanical strength to the tire.

The present invention further provides an amphiphilic block copolymer comprising at least a poly(methacrylic acid) block having a number average molecular weight ($M_n$) of 160 to 1600 g/mol and an aliphatic hydrocarbon chain block, wherein both blocks are connected via a sulfide linkage. This amphiphilic block copolymer is not known in the art. An exemplary embodiment for producing this amphiphilic block copolymer is shown in FIG. 3, wherein Co(II) designates a cobalt(II) complex; V-601 designates a polymerization initiator (dimethyl 2,2'-azobis(2-methylpropionate)); DMPP designates dimethylphenylphosphine; R in the thiol compound RSH designates an aliphatic hydrocarbon chain, preferably is a linear alkyl group having 6 to 30 carbon atoms; and n is an integer between 2 and 20.

The synthesis first involves the polymerization of tert-butyl methacrylate, using a polymerization initiator, in the presence of a Co(II) complex as catalytic chain transfer agent, to obtain a poly(tert-butyl methacrylate) oligomer. This oligomer is further reacted with thiol compound RSH in the presence of DMPP to produce the addition product via Michael-addition. Then, the addition product is hydrolyzed in the presence of an acid, such as trifluoroacetic acid (TFA), to release the butyl groups from the ester groups. The obtained product has methacrylic acid groups.

The Co(II) complex used in the compatibilizer synthesis can be the same Co(II) complex as used in the synthesis of the poly(methacrylic acid) oligomer.

The amphiphilic block copolymer is blended in the rubber composition when blending the other components. In an exemplary embodiment, first the rubber is provided in the mixing apparatus, then the compatibilizer is added, and thereafter the other components are added. The compatibilizer improves the dispersion of the components in the rubber composition and thus improves the self-healing and mechanical properties of the cured rubber.

The examples hereinafter illustrate the invention without restricting the scope of protection.

EXAMPLES

Examples 1 to 4

Examples 1 to 4 refer to different rubber compositions which show the effect of pMAA oligomer and ZnO on the self-healing and mechanical properties of the rubber after curing.

The formulations used are indicated in Table 1 below, wherein the numerical values relate to phr.

TABLE 1

| | NR $SM_4$1 | NR $SM_4$2 | NR $SM_4$3 | NR $M_4$1 |
|---|---|---|---|---|
| NR | 100 | 100 | 100 | 100 |
| pMAA-ZnO salt | 10 | 15 | 20 | |
| pMAA | | | | 5 |
| ZnO | | | | 5 |
| CBS | 0.14 | 0.14 | 0.14 | 0.14 |
| Sulfur | 0.7 | 0.7 | 0.7 | 0.7 |

The indicated components were as follows.

NR: natural rubber.

pMAA: pMAA oligomer having $M_n$ of 350 g/mol and $T_g$ (glass transition temperature) of 109° C. The oligomer was produced from methacrylic acid using cobaloxime boron fluoride at a ratio of MAA to cobaloxime of $10^6$:160.

pMAA-ZnO salt: preformed salt of pMAA with ZnO in a ratio of 1:1.

CBS: N-cyclohexyl-2-benzothiazole sulfonamide.

Sulfur: commercially available sulfur for tire production.

The components are blended as indicated in a Haake PolyLab twin screw compounder at 40° C. and at 40 rpm. Samples were then cured at a temperature of 150° C. for 18.10 minutes at a pressure of 150 bar in a Collin P200 Hot Press to form 9×9 $cm^2$ films with a thickness of 1 mm.

As shown in FIG. 11, first dog bone shaped samples were cut from the films for tensile testing (picture 1). Then, samples for self-healing tests were prepared by cutting the cured rubbers and re-joining them at the overlap end, as illustrated in picture 2 of FIG. 11. Then the samples with 12.8 $mm^2$ overlapped area were heated to 80° C. in a Collin P200 Hot Press for 15, 30 or 120 minutes to provide healing conditions (picture 3). Finally, to evaluate their mechanical properties (stress and strain to break) and healing ability, tensile tests were performed (picture 4), and the results compared with those obtained from the pristine samples. A breakage was not observed in the overlapped region.

The mechanical properties were evaluated by measuring stress (MPa) vs. stroke strain (%) on a Shimadzu AGS-X tensile tester at a strain rate of 100 mm/min. The results for the three formulations containing the preformed Zn salt are shown in FIG. 4*a*. FIG. 4*b* shows the results of the formulation NR $SM_4$1 containing 10 phr of the preformed Zn salt in comparison with the formulation containing the same amount of the pMAA oligomer and ZnO separately.

The three formulations containing the preformed Zn salt were further tested on their mechanical strength at different healing conditions according to using an identical method as was used for the pristine samples. The results are shown in FIGS. 5*a* to 5*f*.

Furthermore, the self-healing efficiency was tested for the NR $SM_4$3 formulation at different temperatures and time periods by viewing under an optical microscope. The images obtained after 0, 30 and 120 minutes are shown in FIGS. 6*a*, 6*b* and 6*c*. FIG. 6 shows that good adhesion is observed immediately after surface contact. As shown in FIG. 6*b*, after 30 min at 80° C. only a small amount of scarring is visible. After 120 min at 80° C., the surface appears uniformly homogenous, as shown in FIG. 6*c*.

FIGS. 7*a* and 7*b* show SEM images of a sample of the NR $SM_4$3 formulation after 30 min healing at 80° C.

The results obtained show that the addition of the preformed zinc salt improved significantly the mechanical strength compared with adding pMAA and ZnO separately (NR $M_4$1). Particularly, for the sample NR $SM_4$3 more than 85% of the stress and strain to break were recovered at the self-healing condition of 80° C. for 120 min. The self-healing ability was strongly improved at an increased temperature of 80° C., compared to room temperature.

Examples 5 to 8

Examples 5 to 8 refer to different rubber compositions which show the effect of the amphiphilic block copolymer compatibilizer on self-healing and mechanical properties of the rubber after curing.

The formulations used are indicated in Table 2 below, wherein the numerical values relate to phr.

TABLE 2

| | NR $SM_4$3 | NR $B_3$1 | NR $B_3$2 | NR $B_3$3 |
|---|---|---|---|---|
| NR | 100 | 100 | 100 | 100 |
| pMAA-ZnO salt * | 20 | 20 | 20 | 20 |
| CBS | 0.14 | 0.14 | 0.14 | 0.14 |
| Sulfur | 0.7 | 0.7 | 0.7 | 0.7 |
| Block $B_3$ | | 2.5 | 5.0 | 7.5 |

The indicated components were as follows.

NR: natural rubber (same rubber as used according to Table 1).

pMAA-ZnO salt: preformed salt of pMAA with ZnO in a ratio of 1:1 with pMAA oligomer having $M_n$ of 350 g/mol and $T_g$ (glass transition temperature) of 109° C.

CBS: N-cyclohexyl-2-benzothiazole sulfonamide.

Sulfur: same sulfur as used according to Table 1.

Block $B_3$: amphiphilic block copolymer.

The amphiphilic block copolymer $B_3$ was prepared as shown in FIG. 3 as follows: A p(t-BMA) oligomer was prepared using CCTP. Here, CoBF (1.31 mg, 8 ppm relative to monomer) was added to a 250 mL RBF (round bottom flask) along with a magnetic stirrer and deoxygenated by nitrogen sparging for 1 hour. tert-Butyl methacrylate (75 mL) was added to a separate 250 mL RBF and also deoxygenated for 1 hour, before 69 mL (424.58 mmol) was transferred to the CoBF (cobaloxime boron fluoride) using a deoxygenated syringe. The mixture was stirred to fully dissolve the CoBF. Meanwhile, to a 500 mL three-necked RBF was added V-601 initiator (0.488 g, 2.12 mmol) and methyl ethyl ketone (180 mL), and the solution was deoxygenated for 1 hour. The solution in the three-necked flask was then heated in an oil bath to 70° C. with continuous stirring, and the monomer/CoBF solution was fed into it over 60 minutes using a syringe pump. The reaction was continued for a further 17 hours after feeding. The p(t-BMA) oligomer product was then dried by rotary evaporation. For the Michael-addition step, p(t-BMA) oligomer (18 g, 18 mmol) was dissolved in acetonitrile (120 mL) and deoxygenated for 1 hour. Previously deoxygenated dodecanethiol (4.368 g, 1.2 equivalent) and dimethylphenylphosphine (49.7 mg, 0.2 equivalent) were then added sequentially and the mixture stirred at room temperature for 6 hours. The reaction was then exposed to air and the solvent removed by rotary evaporation. To form the acid block, the product of the Michael addition was dissolved in dichloromethane and trifluoroacetic acid (TFA) was added (5 equivalents relative to tert-butyl groups). This mixture was then left to stir at room temperature for 24 hours, before the solvent and TFA were removed by rotary evaporation.

Samples for testing on self-healing ability and mechanical properties were prepared in the same manner as in Examples 1 to 4. The measuring methods were the same as in Examples 1 to 4 and the results obtained are shown in FIGS. 8 and 9*a* to 9*c*.

FIG. 8 shows stress (MPa) versus stroke strain (%) for the four formulations with and without compatibilizer.

FIGS. 9*a* to 9*c* are diagrams of stroke strain versus stress for the three cured rubbers containing the amphiphilic block copolymer compatibilizer $B_3$. For NR $B_3$1, FIG. 9*a* shows after 30 mins recovery 60% tensile and 64% strain and after 2 hours recovery 88% tensile and 73% strain. For NR $B_3$2, FIG. 9*b* shows after 30 mins recovery 57% tensile and 66% strain and after 2 hours recovery 74% tensile and 69% strain. For NR $B_3$3, FIG. 9*c* shows after 30 mins recovery 88% tensile and 97% strain and after 2 hours recovery 130% tensile and 94% strain.

As can be seen, the self-healing efficiency enhanced with adding block copolymer.

Examples 9 to 12

Examples 9 to 12 refer to different rubber compositions which show the effect of adding carbon black on self-healing and mechanical properties of the rubber after curing.

The formulations used are indicated in Table 3 below, wherein the numerical values relate to phr.

TABLE 3

| | $SM_4$3 | $CB_{80\ nm}$1 | $CB_{80\ nm}$2 | $CB_{80\ nm}$3 |
|---|---|---|---|---|
| NR | 100 | 100 | 100 | 100 |
| pMAA-ZnO Salt | 20 | 20 | 20 | 20 |
| CBS | 0.14 | 0.14 | 0.14 | 0.14 |
| Sulfur | 0.7 | 0.7 | 0.7 | 0.7 |
| CB (N234) | — | 40 | 25 | 10 |

The indicated components were as follows.

NR: natural rubber (same rubber as used according to Table 1).

pMAA-ZnO salt: preformed salt of pMAA with ZnO in a ratio of 1:1 with pMAA oligomer having $M_n$ of 350 g/mol and $T_g$ (glass transition temperature) of 109° C.

CBS: N-cyclohexyl-2-benzothiazole sulfonamide.

Sulfur: same sulfur as used according to Table 1.

CB (N234): Carbon black with an average diameter of 80 nm.

FIG. 10*a* shows stress (MPa) versus stroke strain (%) for the four formulations with and without carbon black (N234).

FIG. 10*b* is a diagram of stress versus stroke strain for one of the cured rubbers containing 40 phr of carbon black after it had been cut and re-healed at 80° C. in a Collin P200 Hot Press for 30 minutes and 2 hrs.

FIGS. 10*c* is a diagram of stress versus stroke strain for one of the cured rubbers containing 40 phr of carbon black after it had been cut and re-healed at room temperature for 72 hours under a 2 kg weight.

As can be seen, the tensile strength after self-healing at 80° C. for 2 hours increased compared with when no filler was used, and a tensile strength of 3.5 MPa (44% stress recovery) was obtained after self-healing at room temperature.

Examples 13 and 14

Examples 13 and 14 refer to rubber compositions which show the effect of the dienic rubber base material on self-healing and mechanical properties of the rubber after curing.

The formulations used are indicated in Table 4 below, wherein the numerical values relate to phr.

TABLE 4

| | SBR $SM_4$3 TMTS | BR $SM_4$3 TMTS |
|---|---|---|
| SBR | 100 | — |
| BR | — | 100 |
| pMAA-ZnO salt | 20 | 20 |
| TMTS | 0.14 | 0.14 |
| Sulfur | 0.7 | 0.7 |

The indicated components were as follows.

SBR: Styrene-butadiene rubber.

BR: Butadiene rubber.

pMAA-ZnO salt: preformed salt of pMAA with ZnO in a ratio of 1:1 with pMAA oligomer having $M_n$ of 350 g/mol and $T_g$ (glass transition temperature) of 109° C.

TMTS: Tetramethylthiuram monosulfide.

Sulfur: same sulfur as used according to Table 1.

Samples for testing on self-healing ability and mechanical properties were prepared in the same manner as in Examples 1 to 4, with the exception of the curing temperature, which was 160° C., and the curing time, which was 43.17 min for SBR $SM_4$3 TMTS and 77.82 min for BR $SM_4$3 TMTS. The measuring methods were the same as in Examples 1 to 4 and the results obtained are shown in FIGS. 12*a* to 12*d*.

FIGS. 12a and 12b show stress (MPa) versus stroke strain (%) for the SBR and BR formulations with added macromonomer. FIGS. 12c and 12d show the corresponding diagrams of stress versus strain recovery.

As can be seen, the addition of the pMAA-ZnO salt also facilitates self-healing in dienic rubbers other than NR rubbers, wherein after two hours at 80° C. stress recoveries of 120% and 30% were recorded for SBR and BR, respectively.

The invention claimed is:

1. A process for preparing a rubber composition, comprising:

(A) polymerizing methacrylic acid in the presence of a Co(II) complex as catalytic chain transfer agent, to obtain a poly(methacrylic acid) oligomer having a number average molecular weight ($M_n$) from 160 to 3200 g/mol and a dispersity of equal to or less than 4; and (B) blending the poly(methacrylic acid) oligomer with zinc oxide, a dienic rubber, sulfur, and a vulcanization accelerator, wherein the poly(methacrylic acid) oligomer is mixed with zinc oxide to obtain a Zn salt of the poly(methacrylic acid) oligomer, before blending with the dienic rubber, sulfur and vulcanization accelerator.

2. The process of claim 1, wherein:

in step (A), a molecular weight of the poly(methacrylic acid) oligomer is controlled by a ratio of methacrylic acid to Co(II) complex, wherein a ratio of methacrylic acid to Co(II) complex of $10^6$:20 to $10^6$:180 is used.

3. The process of claim 1, wherein the Co(II) complex is a cobaloxime boron fluoride.

4. The process of claim 3, wherein the Co(II) complex is bis[(difluoroboryl)-dimethylglyoximato]cobalt (II).

5. The process of claim 1, wherein:

in step (B), the poly(methacrylic acid) oligomer is mixed with zinc oxide at a weight ratio of 1.0:0.2 to 1.0:2.0.

6. The process of claim 1, wherein:

in step (B), the dienic rubber is selected from a group consisting of: a natural rubber; an isoprene rubber; a styrene-butadiene rubber; a butadiene rubber; and combinations thereof.

7. The process of claim 1, wherein:

in step (B), an amount of the Zn salt of the poly(methacrylic acid) oligomer is 5.0 to 40 phr, based on 100 phr of the dienic rubber.

8. The process of claim 1, wherein:

in step (B), additionally a filler is used in an amount of 5.0 to 80 phr, based on 100 phr of the dienic rubber.

9. The process of claim 1, further comprising curing the rubber composition.

10. The process of claim 1, wherein:

in step (B), additionally an amphiphilic block copolymer compatibilizer is used, wherein the amphiphilic block copolymer compatibilizer comprises at least a poly (methacrylic acid) block and an aliphatic carbon chain block, wherein both blocks are connected via a sulfide linkage.

11. The process of claim 10, wherein an amount of the amphiphilic block copolymer compatibilizer is 0.5 to 7.5 phr, based on 100 phr of the dienic rubber.

12. A process for preparing a rubber composition, comprising:

(A) polymerizing methacrylic acid in the presence of a Co(II) complex as catalytic chain transfer agent, to obtain a poly(methacrylic acid) oligomer having a number average molecular weight ($M_n$) from 160 to 3200 g/mol and a dispersity Đ of equal to or less than 4; and (B) blending the poly(methacrylic acid) oligomer with zinc oxide, a dienic rubber, sulfur, and a vulcanization accelerator, wherein additionally an amphiphilic block copolymer compatibilizer is used, wherein the amphiphilic block copolymer compatibilizer comprises at least a poly(methacrylic acid) block and an aliphatic carbon chain block, wherein both blocks are connected via a sulfide linkage.

13. The process of claim 12, wherein an amount of the amphiphilic block copolymer compatibilizer is 0.5 to 7.5 phr, based on 100 phr of the dienic rubber.

14. The process of claim 12, wherein:

in step (A), a molecular weight of the poly(methacrylic acid) oligomer is controlled by a ratio of methacrylic acid to Co(II) complex, wherein a ratio of methacrylic acid to Co(II) complex of 106:20 to 106:180 is used.

15. The process of claim 12, wherein:

in step (B), the poly(methacrylic acid) oligomer is mixed with zinc oxide at a weight ratio of 1.0:0.2 to 1.0:2.0.

16. The process of claim 12, wherein:

in step (B), the dienic rubber is selected from a group consisting of: a natural rubber; an isoprene rubber; a styrene-butadiene rubber; a butadiene rubber; and combinations thereof.

17. The process of claim 12, wherein:

in step (B), additionally a filler is used in an amount of 5.0 to 80 phr, based on 100 phr of the dienic rubber.

18. The process of claim 12, further comprising curing the rubber composition.

19. The process of claim 12, wherein the Co(II) complex is a cobaloxime boron fluoride.

20. The process of claim 19, wherein the Co(II) complex is bis[(difluoroboryl)-dimethylglyoximato]cobalt (II).

* * * * *